Fig. 1.

Patented Nov. 6, 1934

1,979,985

UNITED STATES PATENT OFFICE 1,979,985

APPARATUS FOR MAKING LINERS

Albert E. F. Moone, Wilmington, Ill., assignor to Orenda Corporation, Chicago, Ill., a corporation of Illinois Application August 15, 1932, Serial No. 628,847

14 Claims. (Cl. 93—1)

This invention relates to a machine for making basket liners and the like. In its illustrated form it comprises apparatus for cutting the liners from a continuous strip of material and passing them continuously through gluing, scoring, folding and stacking devices.

Although glued liners have the obvious advantage that their use requires no special labor in completing the liners as do those which must have their ends joined, they have formerly been too expensive due to the lack of a machine for making them. It is the principal object of this invention to provide such a machine.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts.

In many of the figures parts have been omitted for the sake of clarity. Although my invention may take many forms, only one has been chosen for illustration.

Figure 1:
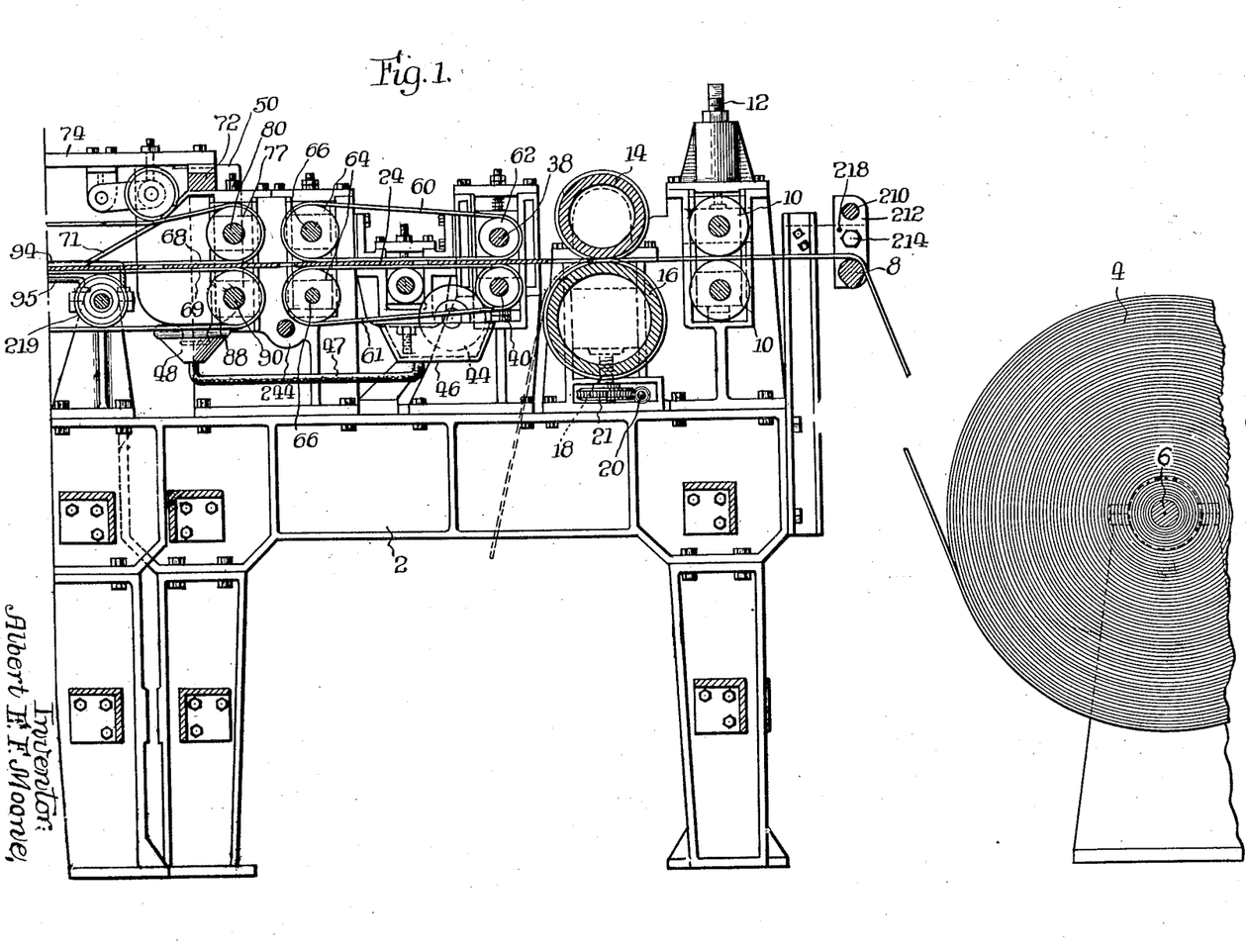
Figures 1 and 2 are respectively right- and left-hand portions of a longitudinal central vertical sectional view of one embodiment of this invention.
Figures 2, 7, 8:
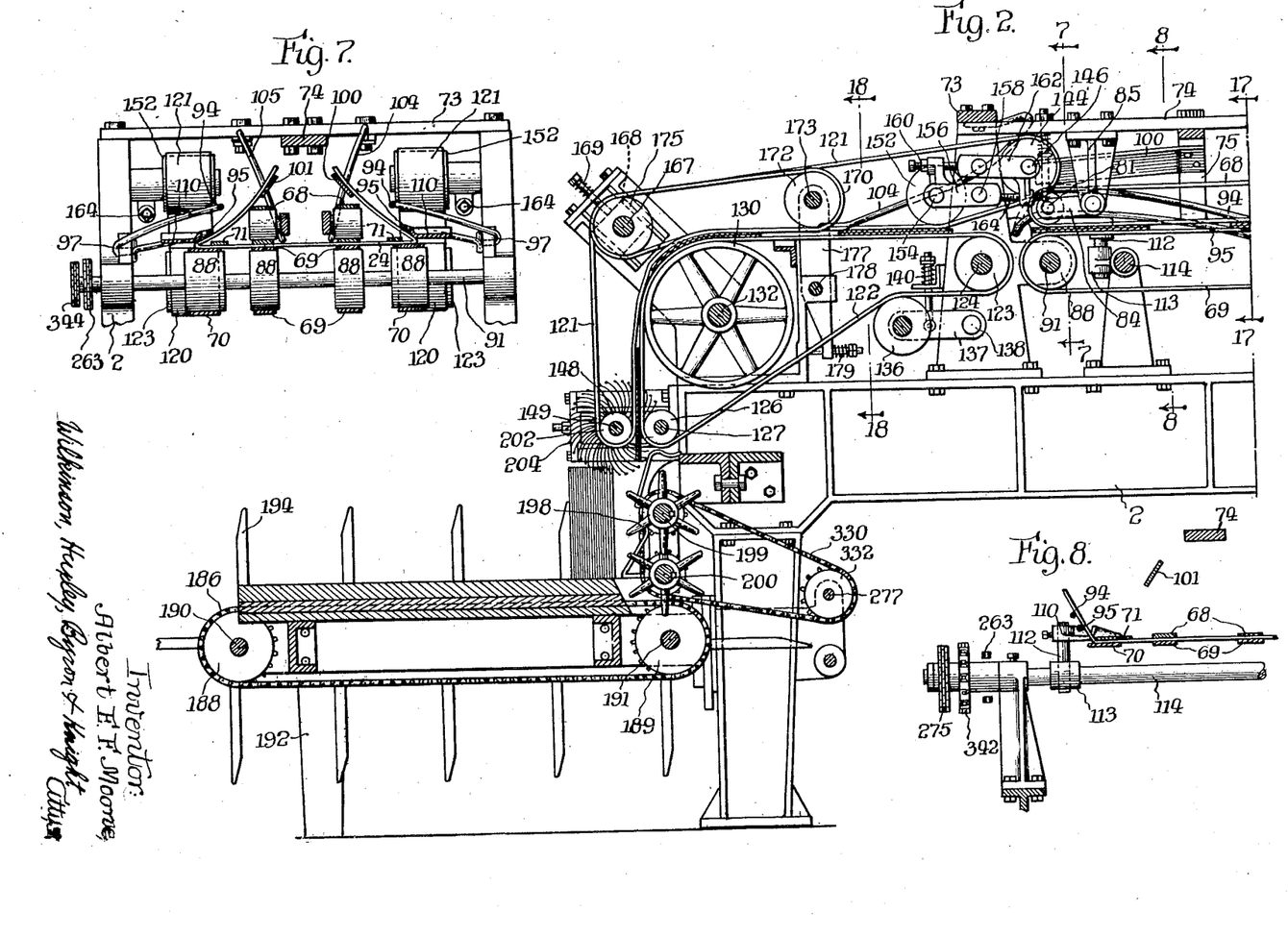
Figures 7 and 8 are fragmentary sectional views through the lines 7—7, 8—8 of Figures 2 and 4.

This machine as a whole is best illustrated in Figures 1 and 2, Figure 1 showing the right or rear half of the machine, and Figure 2 showing the left or front half. The machine as a whole is built upon a suitable frame 2 and is supplied with a light cardboard of suitable quality from a roll 4 which may be suitably mounted on the shaft 6. The cardboard stock is supplied to the machine over a suitable guide bar 8 from which it passes between the feed rolls 10, the pressure of which may be adjusted in any suitable manner, as by the screws 12. From the feed rolls 10 the cardboard web passes between the cutting cylinder 14 and its anvil cylinder 16. Preferably the lower of these two cylinders is vertically adjustable so that it will tend to fall away from the other by its own weight. It may be positively forced toward the upper roll by means of the screws 18, one of which coacts with the bearing block at each end of the lower roll 16. Both of these screws may be operated simultaneously from a single shaft 20 as through suitable worm gearing. Preferably the screws are stationary, and are supported by the worm wheels 21.

Figure 3:
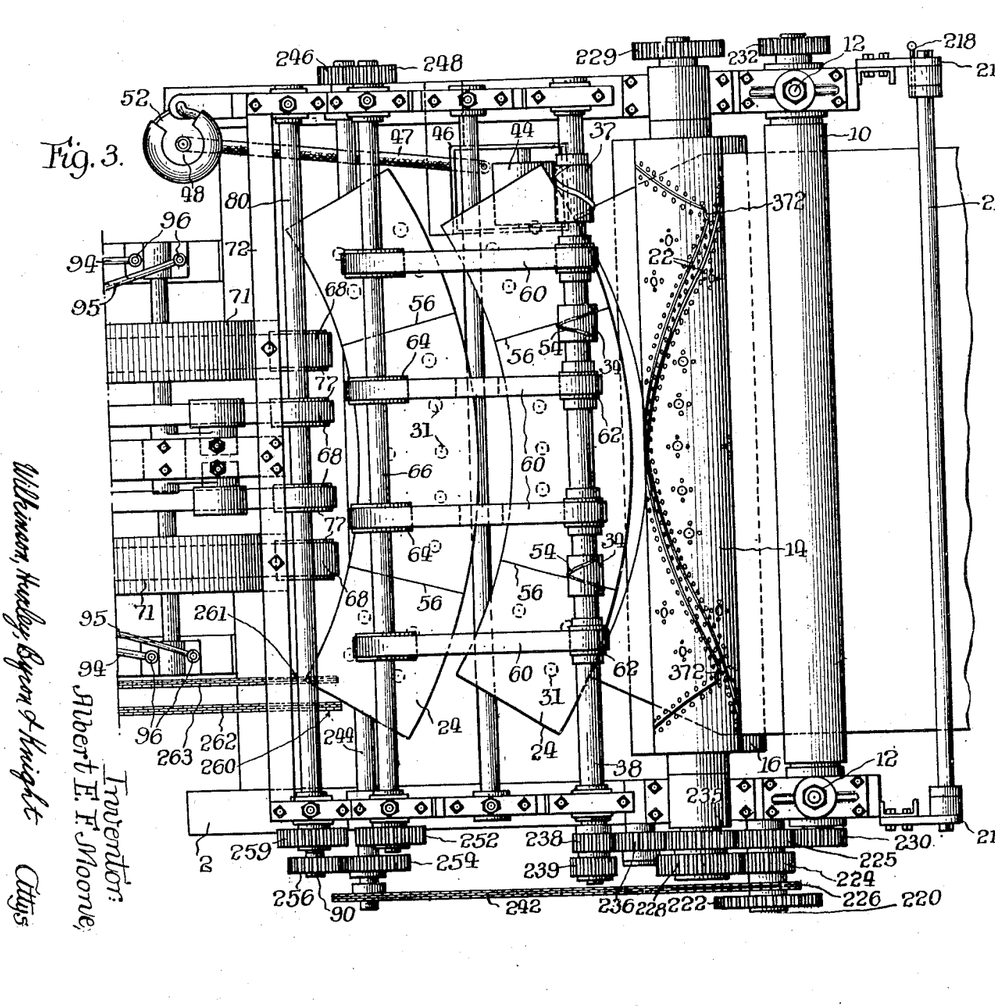
Figures 3 and 4 are corresponding plan views of the same apparatus.
Figure 9:
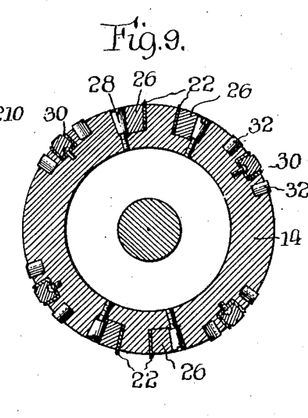
Figures 9 and 10 are fragmentary sectional views of the cutting roller.
Figures 10, 11:
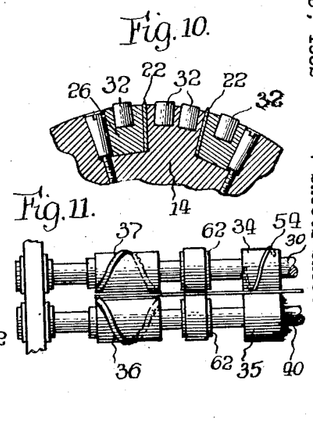
Figure 11 is a fragmentary view showing the gluing and scoring rolls.

Cutting cylinder 14 is provided with a plurality of cutting blades 22, as shown best in Figures 3 and 9, which are so arranged as to cut the liner blanks 24 from the cardboard web. The blades 22 are held securely in position by blocks 26 which are pressed against the blades by wedge screws 28. The plates 22, blocks 26 and screws 28 are all located within a channel formed in a cylinder. There may also be provided a number of circular knives 30 adapted to form pushouts 31 in the blank 24. These pushouts are preferably left attached by three or four small webs in order to avoid the problem of disposing of them, and since many users want them left in. If desired, however, they may be cut out entirely. The circular knives 30 are cup-shaped and are secured in place by screws through their bottoms.

In order to overcome any tendency of the web to follow the cutting roll, the roll is provided with numerous rubber press-off cushions 32 which press the web or the blank away from the knife so that it may pass through the remainder of the machine as intended. These cushions are made sufficiently large to hold themselves in place by friction.

From the cutting cylinders the blank 24 passes between the upper and lower scoring rollers 34 and 35 and between paste-applying roller 36 and the pressure roller 37. All of these rollers may be mounted on shafts 38 and 40. The paste-applying roller 36, which is preferably below the liner, may be supplied with glue in any suitable manner. One desirable way to accomplish this is by the provision of a glue-feeding roll 44 rotating in a pan 46 to which glue is applied to a given level by a pipe 47, funnel 48 and glue bottle 50. The level of the glue in the pan 46 may be controlled by locating the funnel 48 at such position that the mouth of the bottle 50 will be at the level desired. The funnel 48 is of course provided with an air inlet 52 to permit air to get down to the mouth of the bottle in order to let the glue escape when the level lowers.

Each of the scoring rollers 34 is preferably located above the liner, and is provided with a blunt blade 54 which projects only far enough to score or indent the blank 24. These blades are so arranged as to make straight scores 56 radially of the curvature of the blank, in order that the ends of the blank will subsequently double back upon the center portion exactly evenly. The pressure rollers 35 are preferably provided with heavy rubber sleeves which are soft enough to avoid cutting the liner and are firm enough to insure a good score.

After the blank has been separated from the web it of course must be fed forwardly from the machine independently of other blanks. For this purpose it is usually carried between various endless belts some of which are above and some of which are below the blank. For example, before the blank quite leaves the cutting cylinders its advanced ends are caught between the upper belts 60 and the lower belts 61. The rear ends of these belts may ride around suitable pulleys 62 on the shafts 38 and 40 and the forward ends of the belts may run on suitable pulleys 64 on suitable shafts 66. All of these rollers may be keyed to the shafts which are positively driven in a manner to be described. The shafts 38 may be pressed toward the shaft 40 by a suitable spring and its movement in that direction is preferably limited by threaded bolts, as shown. The pressure on the upper sides of the shafts 66 is likewise controlled by a spring and is preferably weak enough to permit the liner blank to be drawn from under it by the belts 68 and 69.

While still engaged by the belts 60 and 61, the blank passes between the upper belts 68 and the lower belts 69 which are likewise driven by suitable pulleys. The belts 68 and 69 are preferably driven faster than the belts 60 and 61 so as to separate the blanks from one another as they are moved along. Below the liner, and outside of the belts 69, are belts 70 which support the liners at the positions of the folds. Above the liners and just inside of the positions of the folds, are the guide strips 71 over which the liners are folded. These guide strips are at their rear ends supported by and secured to an overhead portion 72 of the frame 2 (see Fig. 1). Also secured to this frame portion and to a similar frame portion 73, is a longitudinal beam 74. To this beam is secured a rack 75 which supports the forward portions of guide strips 71.

The belts 68 are mounted on suitable pulleys 77 keyed on rear shaft 80 and mounted on forward stub-shaft 81. The stub-shaft 81 is supported by arm 84 and bracket 85, which is secured to beam 74. The lower belts 69 and 70 are mounted on pulleys 88, which are keyed to shafts 90 and 91 which are suitably journaled in the frame 2.

Figure 4:
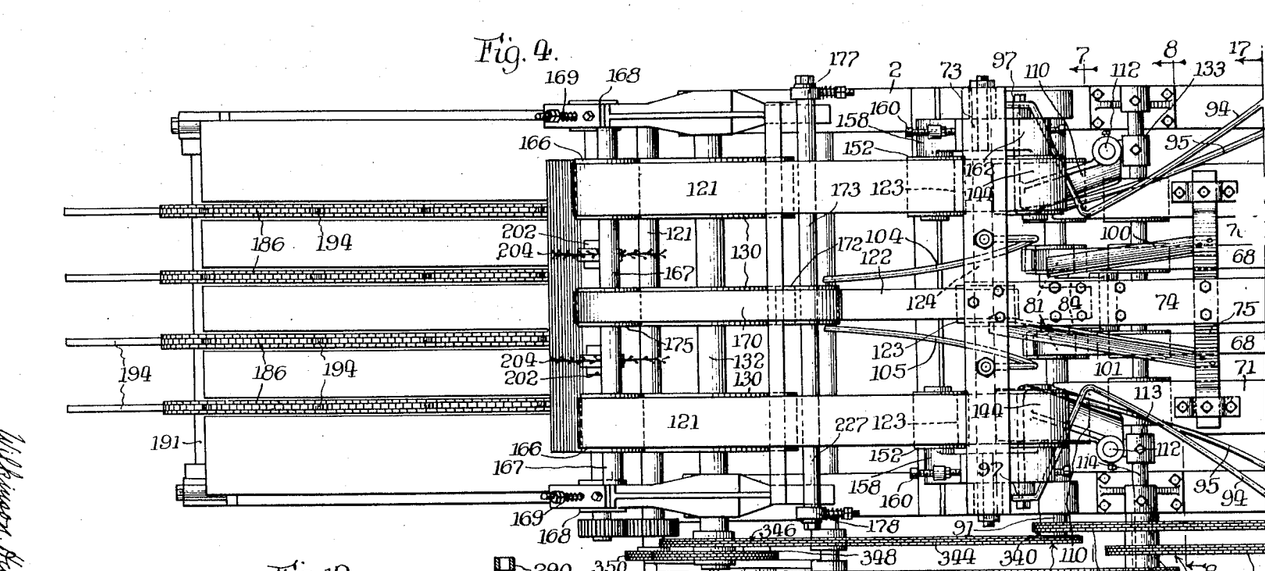

As the blanks are carried along by the belts 68 and 69 their ends are folded upwardly by the stationary folder bars 94 and 95 which are secured to the frame 2 in any suitable manner to points 96 and 97. There are preferably two bars for each end of the blank so that the ends of the blank may be folded positively and quickly and without undue whipping of the ends, and in spite of the air resistance, at high speed operation. The preferred shape of these folder bars can be pretty well seen from Figures 4, 7 and 8. In Figure 8, which represents the bars shortly after their initial operation, it is seen that the first step is an upward bending of the outer end of the liner by the outer folder bars 94. The inner folder bars 95 are comparatively inactive. It is desirable that the outer end be started as early as possible, as it has the furthest to go. The inner folder bars 95 insure the folding over of the ends close to the score lines. Thus, as shown in Figure 7, the inner folder bars 95 are springing the liners against suitable guide plates 100 and 101. These guide plates are secured to rack 75 and hold the ends of the liner from falling against the belts 68. The guide plate 100 which guides the end of the liner to which paste has been applied is slightly shorter than the guide plate 79, so that the pasted end falls clear of the guide plate first. This end is immediately engaged by a stationary fold-down rod 104 which presses it down out of the way of the other end of the liner. The other end of the liner is thereupon released as it passes the guide plate 101 and is immediately engaged by the press-down rod 105 which presses it down on top of and slightly overlapping the other end of the liner.

It may be mentioned here that the parts are preferably so arranged that the liners overlap slightly more than twice the width of the original application of glue in order to accommodate the spreading of the glue. It has been found desirable to originally apply the glue over a strip about five-sixteenths of an inch wide located about three-eighths of an inch from the edge. Under these conditions, the end should overlap approximately three-quarters of an inch. However, the size of the overlap can be varied if desired.

As the liners are carried along by the belts 68 and 69 their edges are pressed under creasing shoes 110. These creasing shoes, though they may have an eighth of an inch or more clearance above the belt 7, are sufficiently close thereto to cause the liner to fold sharply along the line of the score. These creasing shoes may be supported in any suitable manner, and are shown rigidly secured to pegs 112 which are held in a bracket 113 mounted rigidly on the fixed shaft 114.

Figures 6, 17, 18, 19, 20:
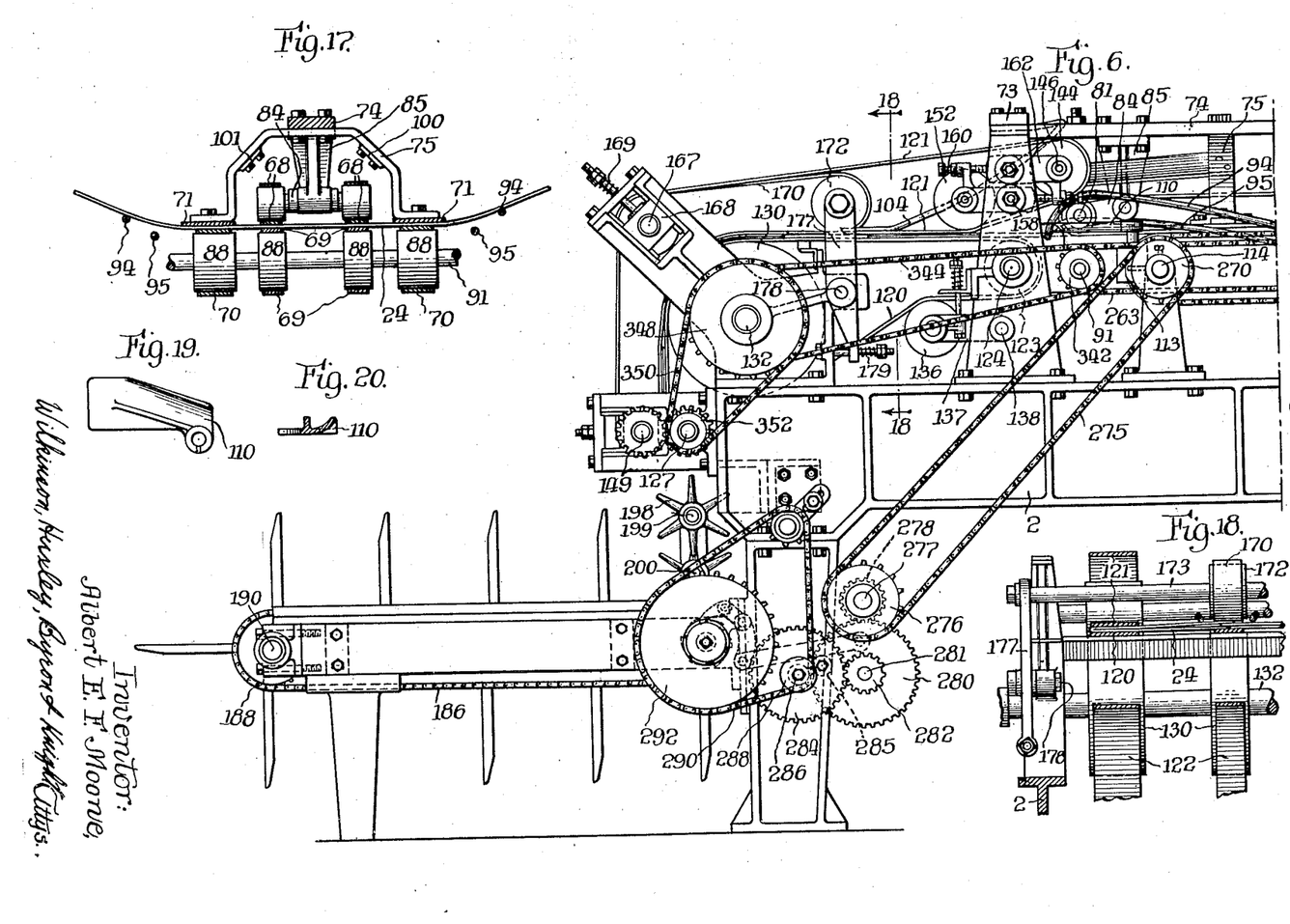
Figures 17 and 18 are fragmentary sectional views taken through lines 17—17 and 18—18, of Figures 2 and 4.
Figures 19 and 20 are detail views of the creasing shoes.

The belts 68 and 69 press the liner forward onto belts 120 and under belts 121, both of which are located along the line of a fold in the liner, as shown in Figure 18. A belt 122 is also provided under the center of the liner. The belts 120 and 122 are carried by the pulleys 123 on shaft 124 mounted on the frame 2 and pulleys 126 driven by shaft 127 journalled in frame 2. The upper runs of these belts 120 and 122 pass around pulleys 130 of large radius, said pulleys being located as shown best in Figure 2 and keyed to the shaft 132 which is suitably journailed in the frame 2. The lower runs of the belts 120 and 122 are drawn tight by idler pulleys 136 which are mounted on arms 137 pivoted to the frame 2 at 138, said arms being drawn in a belt-tightening direction by springs 140 which may be adjustable by suitable nuts, as indicated. The belts 121 are mounted on the pulleys 144 on stub-shafts 146, and the pulleys 148 keyed to shaft 149. The under runs of these belts 121 are pressed by a pulley 152 into proximity with upper runs of belts 120 for the purpose of engaging the liner. As clearly shown in Figure 2, the lower runs of the belts 121 follow belts 120 around the large pulleys 130.

The pulleys 152 are rotatably carried by stub-shafts 154 which are mounted at the elbow of bell crank levers 156 which are pivoted at points 158 to the frame 2. Extending through the short arms of the bell crank lever are the adjustment bolts 160. The shafts 146 are likewise carried by similarly mounted bell crank levers 162 which are likewise fitted with adjustment bolts 164. The adjustment bolts 160 coact with arcuate-shaped portions of bell cranks 162 and the adjustment screws 164 coact with similar arcuate-shaped faces on the bell cranks 156. From a study of Figure 2 it is evident that a take-up adjustment of the screw 160 will press the pulley 152 closer to the belt 120 thereby more tightly squeezing the folded portion of the liner. It is likewise evident that an adjustment of the screw 164 will determine the angle at which belts 121 approach belts 120. The upper reaches of belts 121 pass over pulleys 166 which are rotably mounted on shaft 167 which is carried by a sliding bearing block 168. The sliding bearing blocks 168 are urged in a belt-tightening direction by a suitable spring 169 which may be adjusted by a suitable nut, as shown.

As the liners are fed forwardly under the press-down bars 104 and 105, the overlapped portions of the liner at its center are pressed together. To insure a good joint however, it is desired that they be more firmly pressed together than is possible in this manner. For this purpose there is provided a belt 170 mounted on a suitable pulley 172 on shaft 173, and on pulley 175 carried by shaft 167. The shaft 173 is carried by levers 177 which are pivoted as at 178 to the frame 2. The levers are urged in a belt-tightening direction by suitable springs 179 which may be adjusted by nuts, as shown. From an inspection of Figures 2 and 4 it is evident that the lower run of belt 170 presses the overlapped and pasted ends of the liner against belt 122.

The belts 120 and 121 carry the liners over the large pulleys 130 and deposit them on the stacking table, as indicated in Figure 2. The stacking table is preferably made up of a plurality of endless chains 186 mounted on sprockets 188 and 189 which are carried by shafts 190 and 191, respectively, these shafts being journalled in a table frame 192 in any suitable manner. Each of the chains preferably is provided with a plurality of division bars 194, as indicated in Figure 2.

Figures 21, 22, 23:
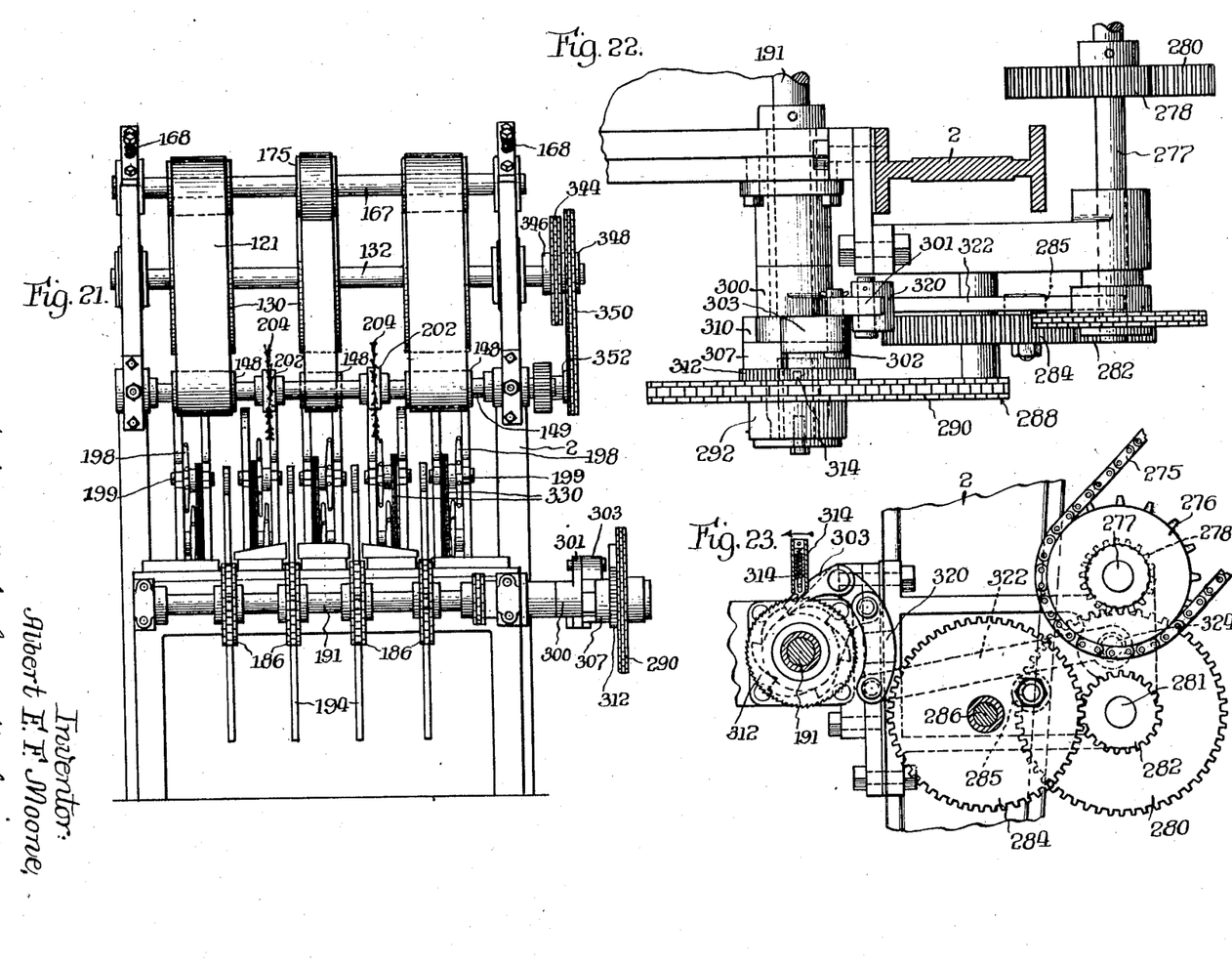
Figure 21 is an end view of the stacker.
Figures 22 and 23 are fragmentary views of the stacker driving mechanism.

In order to keep the liners which have been deposited on the table out of the way of the succeeding liners two separate devices are used in combination. One of these devices is the set of spoked beaters 198 which are mounted on the shafts 199. The other of the devices is the whipper disk 202 rotated by the shaft 149. This whipper disk is provided with a plurality of cords 204 which are preferably provided with knots in their ends. Any number of these various devices may be used though the combination of two whipper disks and four pairs of beaters, as illustrated in Figure 21 has been found satisfactory. The function of these two devices is quite apparent from Figure 2. As the liner is dropped onto the table its bottom portion is kicked forwardly by the beaters and its top portion is jerked forwardly by the whipper cords 204, leaving the space below the succeeding liners free for their reception.

When a given number of liners have been deposited on the table, it is automatically moved by means to be described so that the following liners are deposited in the next pocket, i. e. on the other side of the division bars 194.

Figures 5, 15, 16:
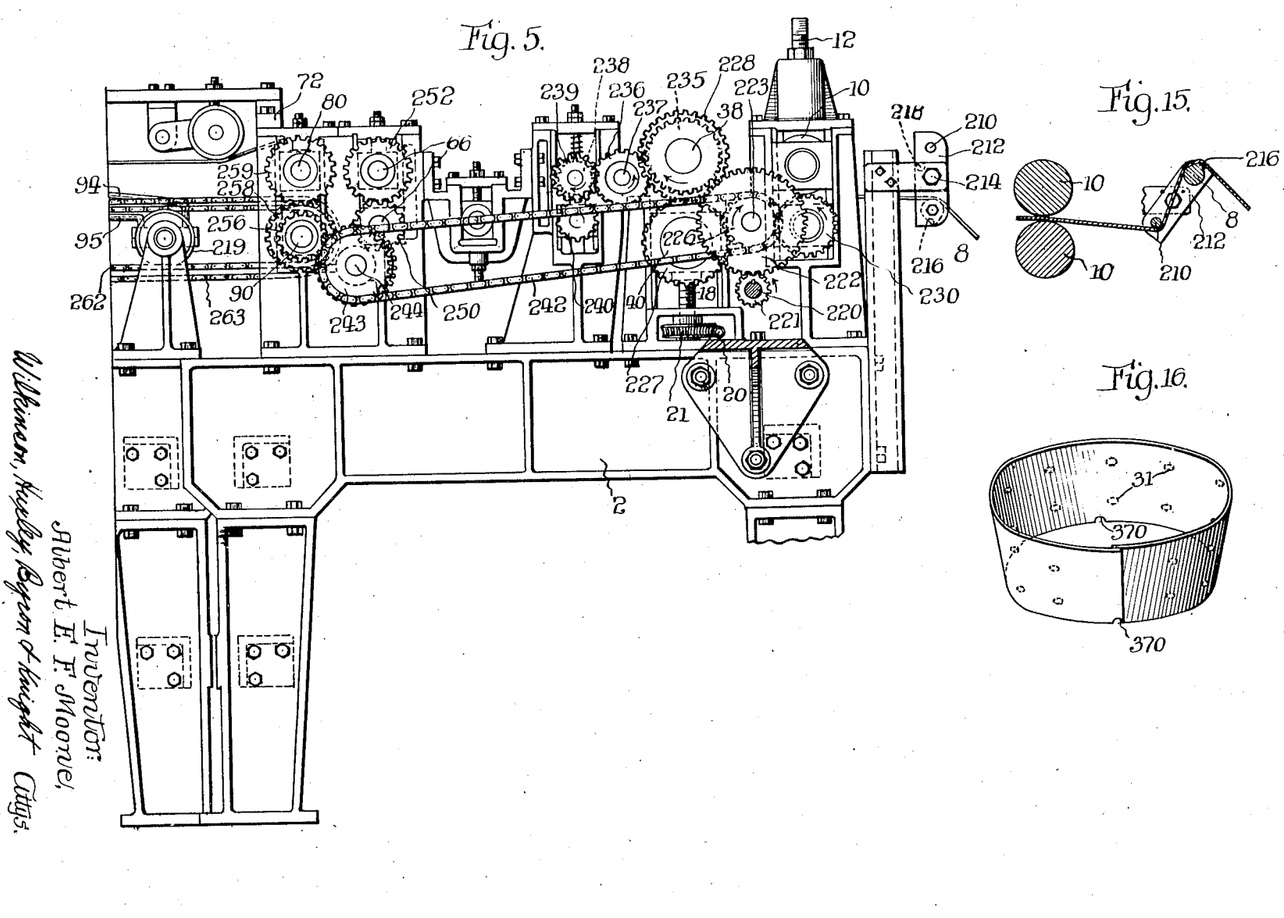
Figures 5 and 6 are corresponding side elevational views of the same apparatus.
Figure 15 is a fragmentary view of the straightening device.
Figure 16 is a perspective view of a liner made by the machine.

In Figure 15 is illustrated a device for straightening out the cardboard to overcome the tendency to curl which is found in such material near the center of the roll. This straightening device includes the guide bar 8 mentioned in connection with Figure 1, and a second guide bar or guide roller 210. These two guide members are carried between a pair of end plates 212 which are pivoted as at 214 to an extension of the frame 2. If the tendency of the cardboard to curl becomes objectionable, the straightening device may be rotated by hand about the pivots 214 to the position shown in Figure 15. It is noted that the guide bar 8 is not cylindrical in shape, but is provided at 216 with a sharply curved surface. With the straightener in the position shown in Figure 15 the cardboard is drawn around this sharply curved surface 216 which bends the cardboard in a reverse direction from that in which it has acquired a set, thereby removing its tendency to curl. The guide bar 210 bends the paper slightly in a reverse direction to overcome the tendency to curl in the new direction. The straightening device may be rotated to any desired position, and of course suitable means indicated diagrammatically by peg 218 are provided for locking it in place.

In order that the belts may firmly grip the liners as they move along, there may be provided any desired number of idler pulleys 219 which press the upper reaches of the lower belts against the upper belts. These pulleys should be slightly above the level of the end pulleys so as to slightly stretch out the upper belt to cause it to grip the liner more positively. The pulleys may be mounted on fixed shafts or on adjustable spring pressed shafts as may be desired. Suitable belt tighteners may be provided for all belts, but they will not usually be needed when the spring pressed idler pressure pulleys are used.

Driving mechanism

Although the machine may be driven through various types of mechanism, the form shown may be described with special reference to Figures 5 and 6. Power may be supplied to the machine in any suitable manner and may be applied directly or indirectly to shaft 220. Keyed to the shaft 220 is a gear 221 which meshes with the gear 222 pivotally mounted on stub-shaft 223. Mounted to rotate with the gear 222 are spur gears 224 and 225 and sprocket 226. When the shaft 220 and gear 221 are rotated in the direction of the arrow, they rotate the gears 224 and 225 and sprocket 226 in the direction of the arrows shown in Figure 5. Gear 224 meshes with a gear 227 keyed to the shaft of cylinder 16. The cylinder 14 is driven through gear 228 which meshes with gear 227 and through the gears 229 on the shafts at the other ends of the cylinders. It is preferred to have these cylinders geared together at both ends for the sake of accuracy and reliability, though this is not essential.

The gear 225 meshes with a gear 230 keyed to the trunnion of the lower feed roll 10. The upper feed roll 10 is keyed to the lower feed roll through the gears 232 at the far ends of the rolls.

Mounted on the shaft of cylinder 14 to rotate with gear 228 is a gear 235. This gear 235 rotates the idler gear 236, which is suitably mounted on the stub-shaft 237. The gear 236 rotates a gear 238 keyed to the shaft 38. Also keyed to the shaft 38 is a gear 239 which meshes with a gear 240 keyed to the shaft 40 thereby turning said shaft in the opposite direction from the direction of rotation of the shaft 38. Thus it is seen that the two shafts 38 and 40 are rotated in opposite directions, thereby turning the belts 60 and 61 in the proper directions to feed the liners forwardly.

The sprocket 226 carries a chain 242 which engages a sprocket 243 which is keyed to a shaft 244. The shaft 244 carries a gear 246 which meshes with the gear 248 which is keyed to the lower shaft 66. The shaft 66 carries a gear 250 which meshes with the gear 252 on the upper shaft 66. It is evident, therefore, that a rotation of sprocket wheel 226 causes the rotation of shafts 66 through the various sprockets and gears just described.

Also carried by the shaft 244 is a gear 254 which meshes with the gear 256 keyed to the shaft 90. This shaft 90 also has keyed thereto a gear 258 which meshes with the gear 259 keyed to the shaft 80, whereby it is seen that sprocket wheel 226 also causes a rotation of shafts 80 and 90 and through it the turning of the belts 68, 69 and 70.

Figure 13:
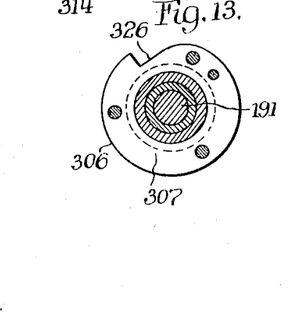
Figure 14:
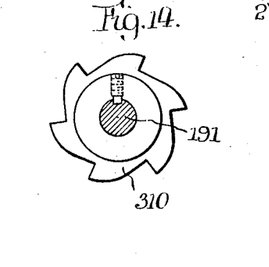

On the shaft 90 are located two sprockets 260 and 261 which drive chains 262 and 263, respectively. Chain 262 drives a sprocket 265 keyed to sleeve 267 which rotates on shaft 114. To the sleeve 267 is also keyed sprocket 270, so that the sprocket 270 is entirely driven by the chain 261. Sprocket 270 drives a chain 275 for driving the stacking table in a manner best shown in Figures 22 and 23, with reference also to Figures 12 to 14.

Chain 275 drives sprocket 276 keyed to shaft 277, which turns a gear 278 mounted thereon. The gear 278 meshes with the gear 280 which is mounted on the shaft 281 which turns the gear 282 keyed thereon. The gear 282 turns gear 284 which bears an eccentric roller 285. The gear 284 which is mounted on stub-shaft 286 also turns a sprocket 288 mounted coaxially therewith, which sprocket engages the chain 290. The chain 290 engages the sprocket wheel 292 which is rotatably mounted on the shaft 191 of the stacking table. It is thus seen that the gear 292 is rotated constantly, a fact which should be kept in mind in the following description.

Figure 12:
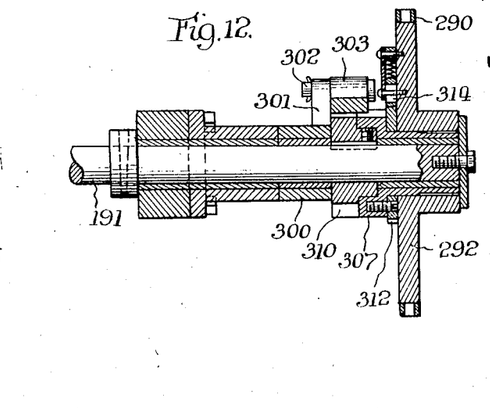
Figures 12 to 14 are fragmentary views of the stacker driving mechanism.

Rotatably mounted on the shaft 191 of the stacking table is a sleeve 300 having an upstanding lug 301 thereon. Pivotally mounted on said lug by means of a pin 302 is a dog 303. Said dog normally rides on the outer surface 306 of the notched disk 307 which is rotatably mounted on the shaft 191. Between the disk 307 and the sleeve 300 is a ratchet disk 310 which is keyed to the shaft 191 and is in a position to be engaged by the dog 303, as shown in Figure 12. However, when the dog is riding on the outer surface 306 of the disk 307 it is raised out of engagement with the ratchet disk 310. At this time, the latter may be prevented from free rotation by a separate spring dog or by any suitable friction means, though ordinarily the friction of the stacking table will be sufficient. Secured to the notched disk 307 is a ratchet wheel 312 which is engaged by a spring pawl 314 which is carried by the constantly rotating sprocket wheel 292. It is thus seen that the ratchet wheel 312 and with it the notched disk 307 are continually rotated with the speed of rotation of the sprocket wheel 292 as a minimum speed. However, the ratchet drive between the sprocket wheel 292 and the notched disk 307 permits this disk to be driven faster when necessary.

Pivoted to the lug 301 is toggle link 320 which is also pivoted to one end of a follower bar 322, which latter is pivoted at its other end to a fixed pivot 324 mounted on the frame 2. The follower bar 322 is in a position to be engaged by the eccentric roller 285 on the gear wheel 284 and to be thrust upwardly thereby. Its return movement may be caused by its own weight or by a suitable spring. When the follower bar 322 is thrust upwardly it rotates, by means of link 320, the sleeve 300 and with it the dog 303. As gear wheel 284 constantly rotates, it follows that dog 303 is continually reciprocating. However, as long as the dog 303 rides on the outer surface 306 it has no effect, but as the continually rotating notch disk 307 completes its cycle so that the notch 326 therein comes under the dog 303 the latter falls into the notch and thereupon engages the ratchet disk 310 previously mentioned. The ratchet disk 310 is thereupon moved forwardly one complete step by the dog 303, thereby turning the shaft 191 a like amount. This turns the chains 186 one step forward, so that each of the dividing bars 194 is replaced by a succeeding dividing bar and a new pocket is formed in a position to receive the liners from the belts 120 and 121.

It is noted that due to the gearing which is used, this shift of the stacking table is quite rapid. The gear 284 is rotated fairly rapidly in counterclockwise direction so that the roller 285 coacts with the follower 322 near the fulcrum of the latter, making its up stroke quicker than its return stroke. Although the sprocket wheel 292 rotates relatively slowly, a quick movement of dog 303 is not prevented, since the notched disk 307 is permitted by the ratchet 314 to move faster than sprocket wheel 292 when the notch is engaged by dog 303. By choosing the proper size of sprocket wheel 292 the stacking table may be made to shift after any given number of liners have been fed to each pocket. The spoke paddles 198 are constantly rotated by chains 330, which are rotated by sprockets 332 on shaft 277.

As previously mentioned, the chain 263 is driven by a sprocket 261 on shaft 90. Chain 263 drives a sprocket 340 which is keyed to shaft 91. This not only drives the pulleys 88 mounted thereon, but also drives another sprocket 342 keyed to the shaft 91. Sprocket 342 drives the chain 344 which in turn drives a large sprocket wheel 346 keyed to shaft 132, thereby turning the large pulleys 130. Also keyed to the shaft 132 is a second large sprocket wheel 348 which drives the chain 350, which in turn drives sprocket 352 keyed to the shaft 127, thereby driving the belts 120 and 121.

As seen in Figure 16, the liner is preferably provided with one or more thumb holes or notches 370. To produce these, the cutting cylinder is provided at certain corner portions of the blades and elsewhere if desired, with a circular cut-out blade 372 which so cuts the liner as to form at the overlap joint the thumb-hole 370. The purpose of this is to render more easy the opening of the liners from their flat folded condition. These cut-out blades 372 may be formed and attached in the same manner as the circular push-out blades 30 except that they are ground down in the unused portion and are not notched in such manner as to leave a securing web, as are the circular blades 30. If desired, these cut-outs may be provided at both ends of the overlap, or as shown in Figure 16, may be provided at two points almost but not quite diametrically opposite each other, so that when folded the thumb of one hand can use one thumb hole to grasp one side of the liner, and the finger of the other hand can use the other thumb-hole to grasp the other side of the same edge of the liner.

Operation

The operation of the machine may be made more clear by tracing the movements of the cardboard through the machine. The cardboard is drawn from the roll 4 by the feed rollers 10, being straightened if necessary by the guide bars 8 and 210. From the feed rollers the cardboard passes between cutting cylinders 14 and 16. These cylinders cut the blanks from the strip and thrust them between the moving belts 60 and 61, by which they are carried forward. In their initial movement with the belts 60 and 61 they are scored upon the scoring rollers 34, which press against rubber rollers 35. Simultaneously roller 36 applies glue to the under side of the end of the liner.

From the belts 60 and 61, the liners are passed to the belts 68 and 69 which are moving faster than the belts 60 and 61 to separate the liners from one another. The belts slide the liners along the follower bars 94 and 95 which fold the ends of the liners over against the guide plates 100 and 101. As the liners slide along these guide plates the folds are creased down by the creasing shoes 110. Belts 68 and 69 then pass the liners to the belts 120 and 121 which grip them at their creased portions, thereby creasing the same more tightly. As the liners are fed further, the ends are pressed down by the press-down rods 104 and 105, rod 104 pressing down first the end to which glue has been applied. The glued and overlapping ends are then pressed firmly together by passing between belts 120 and 170.

Belts 120 and 121 then carry the liners around pulleys 130 and deposit them on the stacking table, as shown best in Figure 2. As each liner is dropped on the table, it is shifted out of the way by the paddles 198 and the whip cords 204. The table is moved periodically in the manner fully described above. From the stacking machine the liners may at first be passed to suitable bundling apparatus, if desired.

It may be noted here that as the liners reach the creasing shoes 110 they should be partially folded approximately along the score lines rather than perpendicular to the movement of the liner, so that the creasing shoe will crease it exactly along the line.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit. Likewise it should be recognized that in many of its aspects this invention is useful for many other purposes than making liners.

What is claimed is:

1. A liner making machine including means effective for feeding a continuous strip of cardboard to a machine, means effective for cutting arcuate shaped liner blanks from said continuous strip and for scoring said strip along the desired radial lines of folding, means effective for applying glue to one edge of the blank, means effective for folding said blank into a continuous loop along the scored lines and for pressing the glued end firmly against the other end by pressure members acting directly on the ends.

2. A liner making machine including means effective for feeding a continuous strip of cardboard to a machine, means effective for cutting arcuate shaped liner blanks from said continuous strip and for scoring said strip along the desired radial lines of folding, means effective for applying glue to one edge of the blank, means effective for conveying the individual blanks, cam-like means arranged and effective to react to the movement of said blanks by folding the ends thereof over onto the center portion in such order as to place the glue between the two ends, and means effective for pressing the pasted end of each liner firmly against the other end of each liner.

3. A liner making machine including means effective for feeding a continuous strip of cardboard to a machine, means effective for cutting arcuate shaped liner blanks from said continuous strip and for scoring said strip along the desired radial lines of folding, means effective for applying glue to one edge of the blank, means effective for conveying the individual blanks, cam-like means arranged and effective to react to the movement of said blanks by folding the ends thereof over onto the center portion, in such order as to place the glue between the two ends, and means effective for completing the fold-down of said ends and for pressing the pasted end of each liner firmly against the other end of each liner.

4. A liner making machine including means for feeding a continuous strip of cardboard to a machine, means for cutting arcuate shaped liner blanks from said continuous strip and for scoring said strip along the desired radial lines of folding, means for conveying the individual blanks, cam-like means arranged to react to the movement of said blanks by folding the ends thereof over from the center portion, means for creasing said blanks along a scored line, guide plates for holding the ends of the blanks away from interference with the conveying belts, and further stationary cam-like means for thereafter folding down the end portions against the center portion.

5. A liner making machine including means for feeding a continuous strip of cardboard to a machine, means for cutting arcuate shaped liner blanks from said continuous strip and for scoring said strip along the desired radial lines of folding, means for folding said blank into a continuous loop along the scored lines and for pressing the glued end against the other, a set of belts above and below the center portion of the cut-out blanks for conveying the same, folder bars for folding over the end portions of the liners as they are moved along said bars, creasing shoes for creasing the folded over portions along the scored lines, guide plates for preventing the ends from interfering with the conveying belts, an additional set of belts for engaging the creased portions of the liners and conveying the same thereby, and fold-down bars for pressing the ends against the center portion by cam-like action while the liner is thus conveyed.

6. A liner making machine including means for feeding a continuous strip of cardboard to a machine, means for cutting arcuate shaped liner blanks from said continuous strip and for scoring said strip along the desired radial lines of folding, means for applying glue to one edge of the blank, means for folding said blank into a continuous loop along the scored lines and for pressing the glued end against the other, a set of belts above and below the center portion of the cut-out blanks for conveying the same, folder bars for folding over the end portions of the liners as they are moved along said bars, creasing shoes for creasing the folded over portions along the scored lines, guide plates for preventing the ends from interfering with the conveying belts, an additional set of belts for engaging the creased portions of the liners and conveying the same thereby, fold-down bars for pressing the ends against the center portion by cam-like action while the liner is thus conveyed, and additional centrally located belts for pressing the ends of said liner firmly together.

7. A liner making machine including means for feeding a continuous strip of cardboard to a machine, means for cutting arcuate shaped liner blanks from said continuous strip and for scoring said strip along the desired radial line of folding, means for folding said blank into a continuous loop along the scored lines and for pressing the glued end against the other, a set of belts above and below the center portion of the cut-out blanks for conveying the same, folder bars for folding over the end portions of the liners as they are moved along said bars, creasing shoes for creasing the folded over portions along the scored lines, guide strips within the fold and adjacent thereto during part of the two last mentioned operations for preventing the occurrence of the fold in an erroneous position, guide plates for preventing the ends from interfering with the conveying belts, an additional set of belts for engaging the creased portions of the liners and conveying the same thereby, and fold-down bars for pressing the ends against the center portion by cam-like action while the liner is thus conveyed.

8. A liner making machine including means for feeding a continuous strip of cardboard to the machine, means for cutting liner blanks therefrom, means for scoring the liner blanks comprising a scoring roller having a raised helically extending scoring edge thereon and a flat pressure roller having a surface resilient enough to prevent fracturing the fibers of said liner blank but firm enough and backed by sufficient pressure to press the blank sharply against and around said scoring edge, and means for folding said liner along the scored lines and for joining the ends thereof to form a continuous liner.

9. A liner stacking machine comprising a movable stacking pocket, means for feeding a continuous series of liners to said movable pocket at a given point, means for shifting said liners as fed to another part of said pocket, said means including spoked paddle wheels and means for rotating the same, and rotating whip cords for engaging and shifting the upper parts of said liners nearest said feeding means.

10. A liner stacking machine comprising a movable stacking pocket, means for feeding a continuous series of liners to said movable pocket at a given point, and means for shifting said liners as fed to another part of said pocket, said means including rotating whip cords for engaging and shifting the upper parts of said liners nearest said feeding means.

11. A liner making machine including means for feeding a continuous strip of cardboard to a machine, means for cutting liner blanks from said continuous strip and for scoring said strip along the desired lines of folding, means for folding said blank into a continuous loop along the scored lines and for pressing the glued end against the other, a set of belts above and below the center portion of the cut-out blanks for conveying the same, means for folding over the end portions of the blanks as they are thus conveyed, an additional set of belts for engaging the folded portions of said liners to further convey the same, means for pressing down the end portions against the center portion as the liner is thus conveyed, at least one set of said conveying belts comprising a lower belt and an upper belt located immediately thereabove, and a pressure roller located under the upper reach of the lower belt and pressing the same above the level of the ends of said upper reach and thereby pressing the liners carried thereon firmly against the upper belt.

12. A liner making machine including means for feeding a continuous strip of cardboard to a machine, means for cutting arcuate-shaped liner blanks from said continuous strip and for scoring said strip along the desired radial lines of folding, means for conveying the individual blanks, cam-like means arranged to react to the movement of said blanks by folding the ends thereof over from the center portion, creasing shoes along the line of travel of the blanks for creasing the blanks along the scored line as they pass under the said shoes, said cam-like means being so shaped as to deliver the blank to the creasing shoes partially folded approximately along said scored lines in such manner that the shoes will crease them exactly along said scored line.

13. A liner stacking machine comprising a movable stacking pocket, means for feeding a continuous series of liners to said movable pocket at a given point, means for shifting said liners as fed to another part of said pocket, said means including spoked paddle wheels located at the back side of the pocket and having widely spaced paddle blades not more than half as long as the height of the liners, and means for rotating the paddles in the direction to most easily receive the liners as well as to push them away immediately.

14. A liner making machine including means effective for feeding a continuous strip of cardboard to a machine, means effective for cutting liner blanks from said continuous strip and for scoring said strip along the desired lines of folding, means effective for applying glue to one edge of the blank, means for conveying the individual blanks, cam-like means arranged to react to the movement of said blanks by folding the ends thereof over from the center portion, means for creasing said blanks along a scored line, and guide members for holding the ends of the blanks away from interference with the conveying belts, one of said guide members terminating in advance of the other to cause the ends of the liner to be folded down in the proper order to place the glue between the ends.

ALBERT E. F. MOONE.